US007097005B2

(12) United States Patent
Angermann

(10) Patent No.: US 7,097,005 B2
(45) Date of Patent: Aug. 29, 2006

(54) ABSEILING DEVICE

(75) Inventor: Gerold Angermann, Spittal/Drau (AT)

(73) Assignee: Lea Walter, Spittal/Drau (AT)

( * ) Notice: Subject to any disclaimer, the term of this patent is extended or adjusted under 35 U.S.C. 154(b) by 0 days.

(21) Appl. No.: 10/499,414

(22) PCT Filed: Oct. 31, 2002

(86) PCT No.: PCT/AT02/00307

§ 371 (c)(1),
(2), (4) Date: Jul. 26, 2004

(87) PCT Pub. No.: WO03/051459

PCT Pub. Date: Jun. 26, 2003

(65) Prior Publication Data

US 2005/0092557 A1 May 5, 2005

(30) Foreign Application Priority Data

Dec. 18, 2001 (AT) ............................ A 1053/2001

(51) Int. Cl.
*B60T 8/72* (2006.01)

(52) U.S. Cl. ................. 188/181 A; 188/185; 188/130; 188/139

(58) Field of Classification Search ................ 188/180, 188/181 A, 182, 184, 185, 188, 126, 129, 188/130, 134, 135, 136, 139, 65.3, 65.1, 188/65.2; 182/192, 193, 241, 234; 254/267, 254/371, 391

See application file for complete search history.

(56) References Cited

U.S. PATENT DOCUMENTS 3,662,992 A * 5/1972 Vittert ........................ 254/391
3,946,989 A * 3/1976 Tsuda ......................... 182/241
4,106,753 A * 8/1978 Cavalieri et al. ........... 254/384
4,198,033 A * 4/1980 de la Messuziere et al. .......................... 254/391
4,254,941 A * 3/1981 Tanson ....................... 254/267
4,359,139 A * 11/1982 Bloder ....................... 182/234
4,533,026 A * 8/1985 Bernard ...................... 188/184
5,280,828 A * 1/1994 Reynoso et al. ............ 188/184
5,483,849 A * 1/1996 Orii et al. ...................... 74/506
5,701,972 A * 12/1997 Bloder ....................... 182/234
5,799,753 A * 9/1998 Peltier ......................... 182/234
6,223,868 B1 * 5/2001 Wullimann ................. 188/188

FOREIGN PATENT DOCUMENTS

DE 198 18 688 C1 1/2000

* cited by examiner

*Primary Examiner*—Devon Kramer
(74) *Attorney, Agent, or Firm*—Karl Hormann

(57) ABSTRACT

A rappelling or abseiling device with a rope guide pulley which is rotationally mounted in a housing and is connected by a toothed wheel to two toothed shafts of centrifugal power shoes provided with brake pads, the brake shoes of at least one of the brakes being provided with an additional pair of brake pads and the brake shoes being maintained in their idle position by an electromagnet and a cooperating counter element.

5 Claims, 6 Drawing Sheets

ABSEILING DEVICE

BACKGROUND OF THE INVENTION

1. Field of the Invention

The invention relates to a rappelling device provided with a rope guide pulley rotatably mounted in a housing and which by way of a toothed wheel is operatively connected to two toothed shafts of a centrifugal braking device provided with pairs of brake shoes having brake pads mounted thereon acting upon, or reacting with, the housing of the device.

2. The Prior Art

Such devices which can be attached to a stationary structure such as a building, for instance, by means of a karabiner (snap hook) are known in various structures, for instance from German patent specification DE 198 18 688 C1. In these rappelling devices which serve for lowering loads, in particular persons, and which are used as rescue equipment in particular, the rappelling velocity varies as a function of the weight of the load or person to be lowered. The greater the weight, the higher is the rappelling velocity.

OBJECT OF THE INVENTION

It is an object of the invention to improve the function of the centrifugal braking devices.

SUMMARY OF THE INVENTION

In a device of the kind referred to above, this is accomplished in accordance with the invention by of two safety brake pads being provided on the brake shoes supporting the brake pads which provide for the constant rappelling velocity of one of the centrifugal braking devices, the additional safety brake pads being actuated when the force of the brake pads decreases below a certain minimum and significantly reduce the rappelling velocity, the brake pads being maintained in the idle position disposed on opposite outer surfaces of the brake shoes.

Preferably, the brake pads and the additional brake pads are seated in recesses to extend beyond the surface of the brake shoes. Open eye bolts mounted at both sides of the housing are useful for guiding the rope running over the rope guide pulley.

The device in accordance with the invention also provides an optical indication to its user that it requires maintenance service, i.e. that the proper brake pads are depleted and require replacement.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENTS

Figure 1:
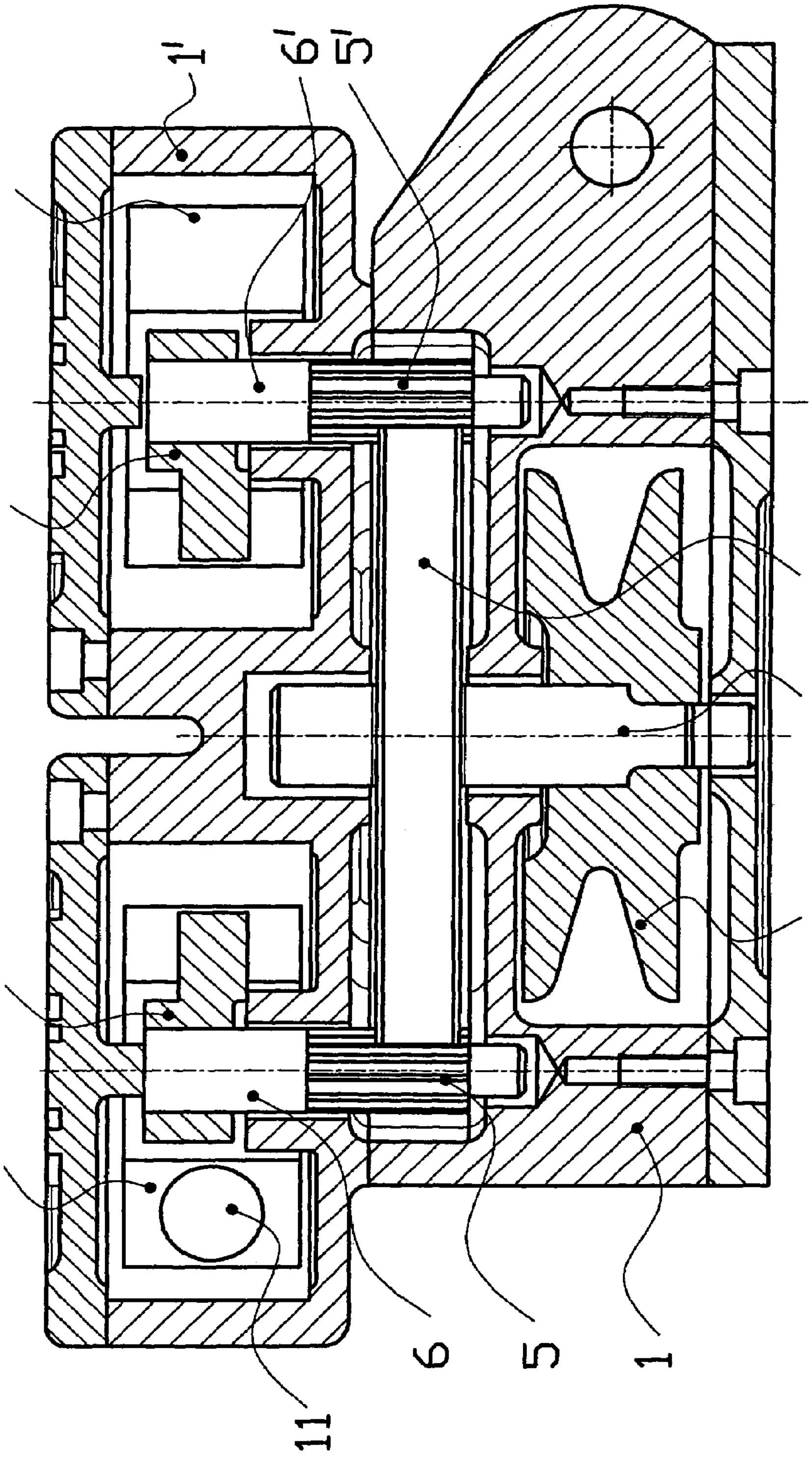
FIG. 1 is an axial section along line I—I of FIG. 1 of a rappelling device in accordance with the invention.

The rappelling device shown in the drawings is provided with a housing 1 assembled of several components, in which a rope guide pulley 2 is journaled for rotation on a shaft 3. A toothed wheel 4 is keyed to the shaft 3 of the rope guide pulley 2 and meshes with diametrically opposite sprockets 5 and 5' mounted on shafts 6 and 6', respectively, which are slidably mounted in the housing 1 and which at their upper end support a hub 7 and 7', respectively. One brake shoe 8, 8' of a pair thereof is mounted for pivoting at 9 on each hub 7 and 7'.

Figure 2:
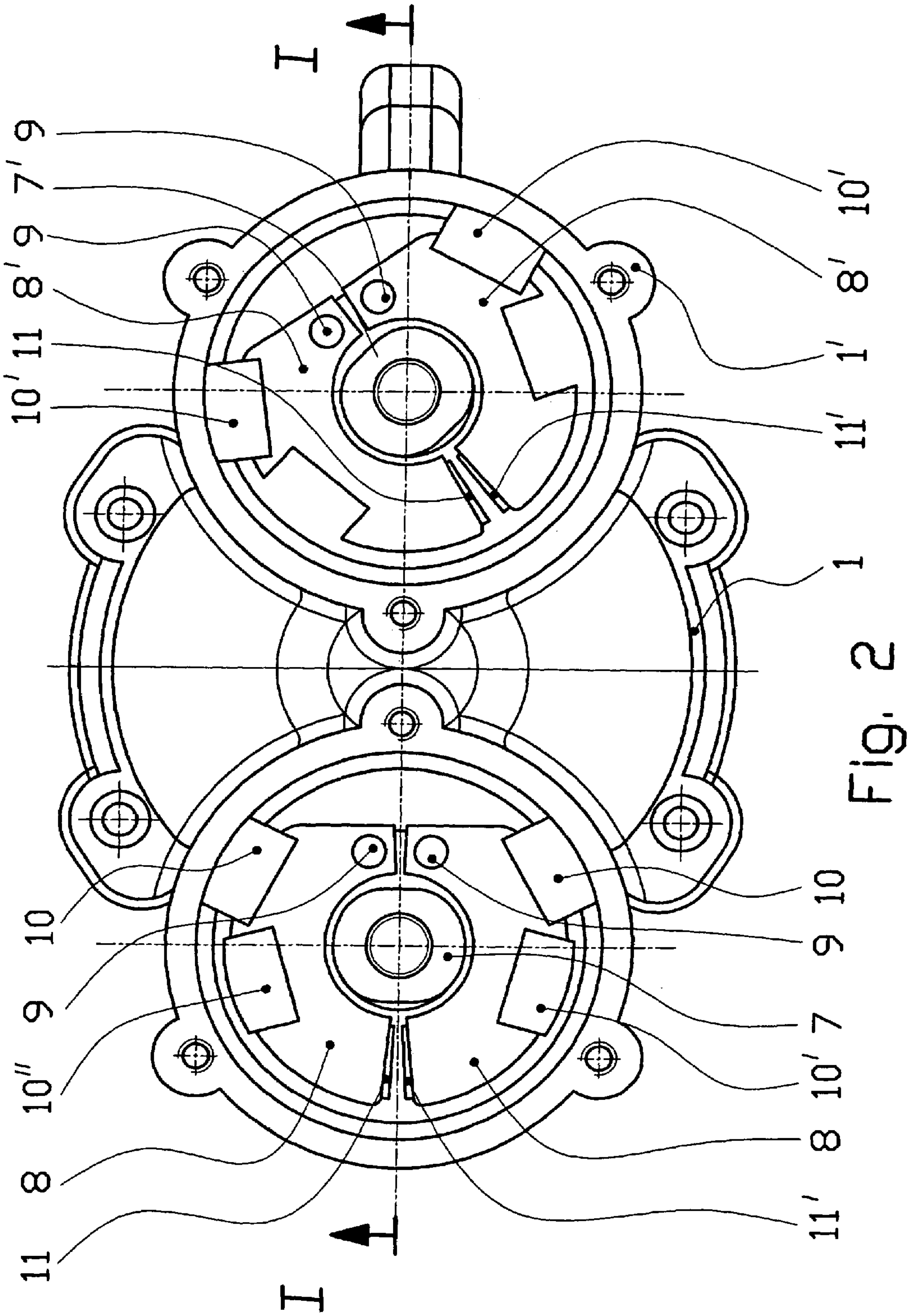
FIG. 2 is a schematic top elevation of the device of FIG. 1 with housing covers removed.
Figure 3:
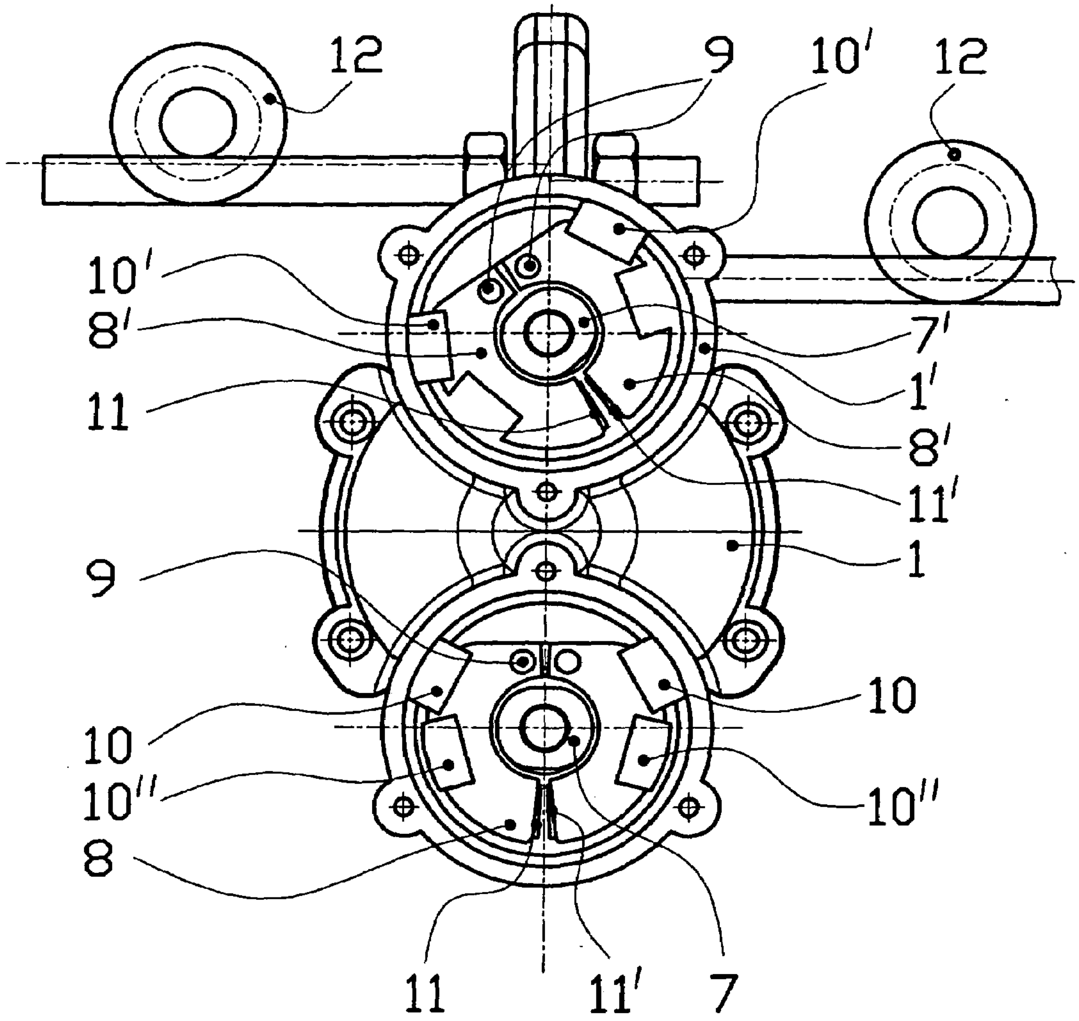
FIGS. 3–6 depict a further embodiment of the invention.
Figure 4:
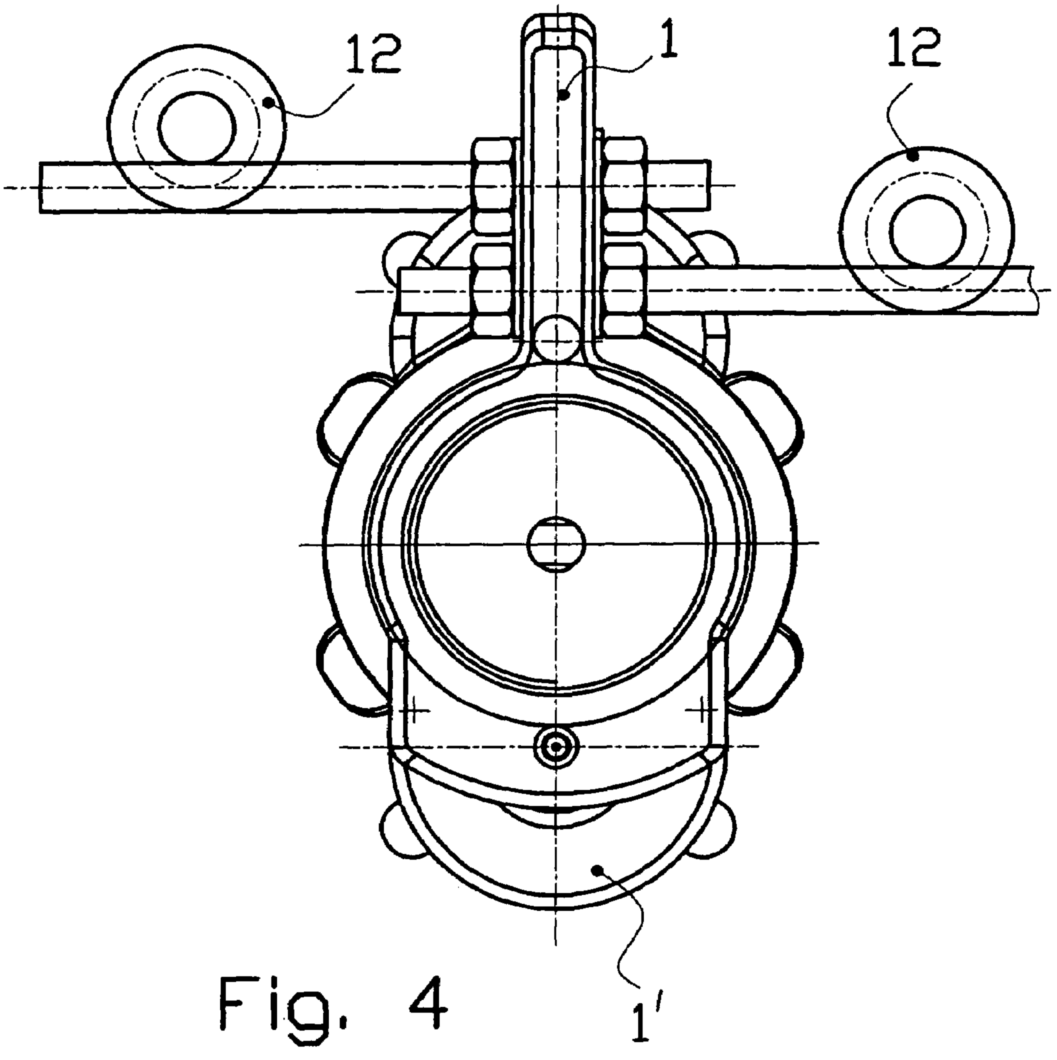
Figure 5:
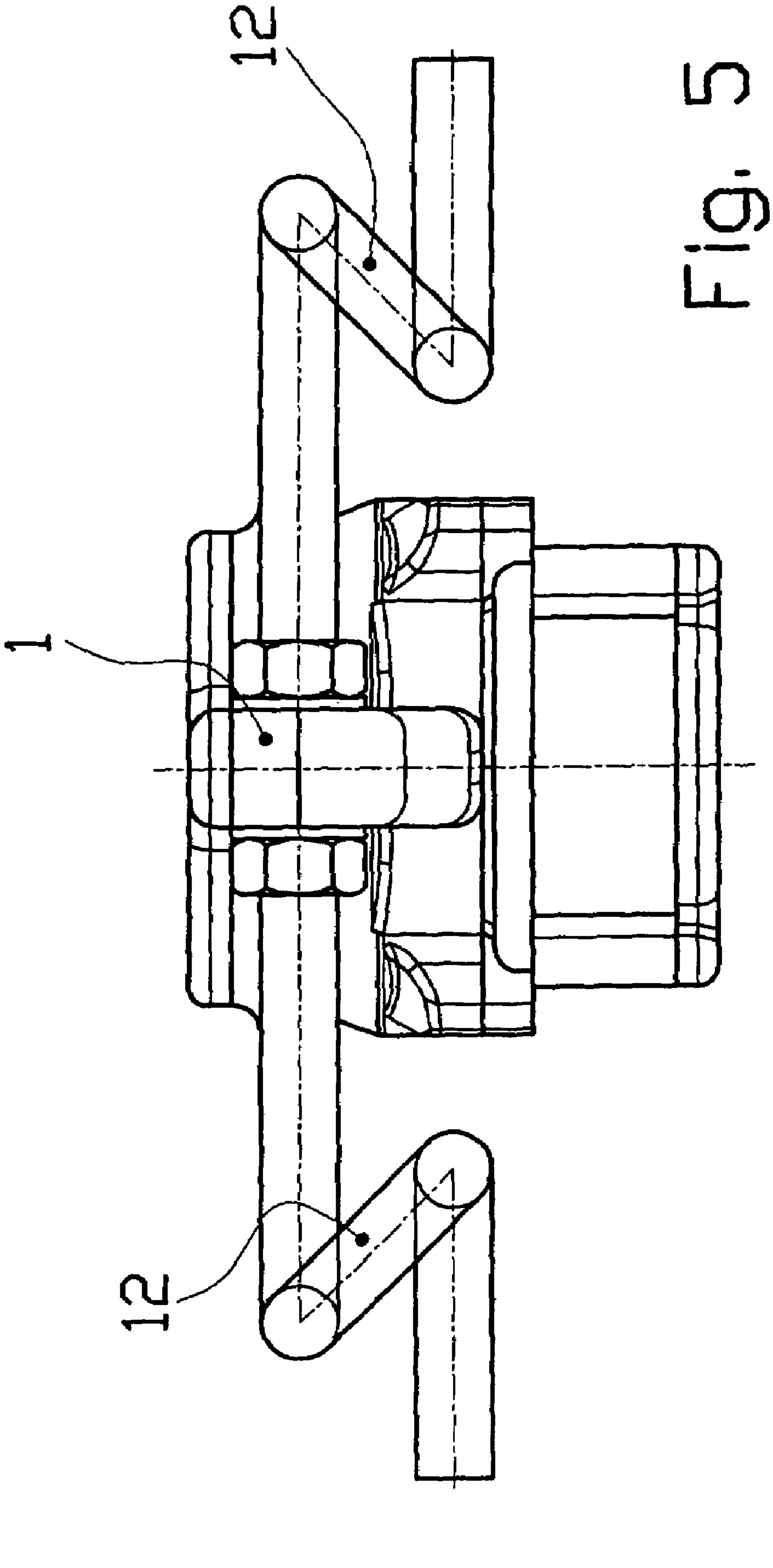
Figure 6:
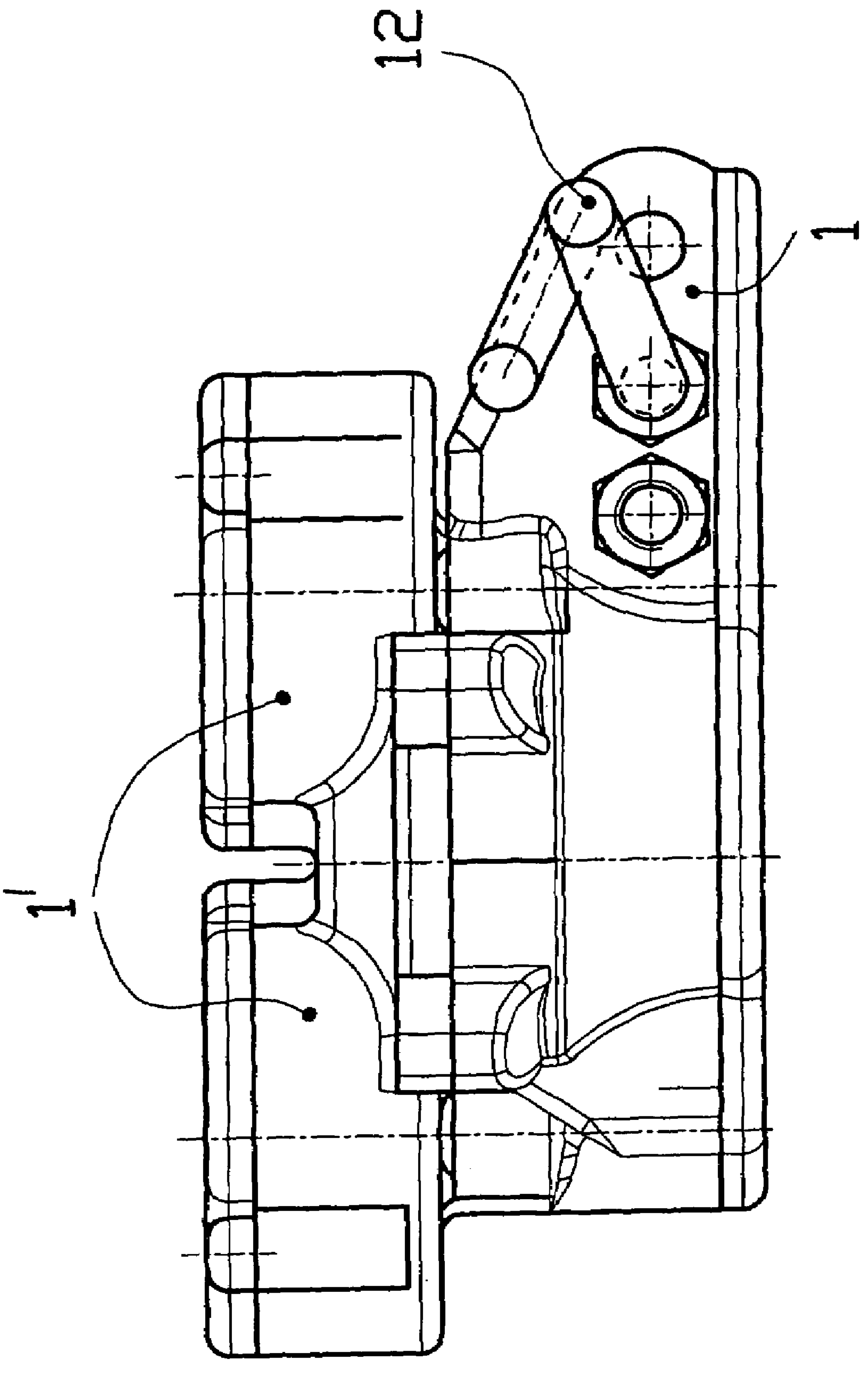

The drawing depicts the idle position in which the brake shoes 8 and 8' and their brake pads 10 and 10' abut the circular internal wall of the associated brake housing section 1'. As a result of centrifugal force, the brake pads 10 of the brake shoes 8 of the brake device at the left of FIG. 1 will during operation move into tighter engagement with the interior wall of the housing section 1' and will in this manner slow the rotations of the rope guide pulley 2 to the necessary extent. As shown in FIG. 2, aside form brake pads 10 additional safety brake pads 10" are provided on the brake shoes 8; they are of a lesser thickness than brake pads 10. A soon as these safety brake pads 10" engage the interior wall as well, the lowering velocity will be significantly reduced, e.g. to half the former velocity.

At their free ends, the brake shoes 8, 8' are respectively provided with a circular magnet 11 and an iron core 11' by which they are maintained in their idle position. Consequently, there is no resistance when the rope is pulled. The force of the magnet is such that at a certain number of rotations, e.g. 0.4 m/sec, or as soon as the load exceeds a certain weight, for instance 60–70 kg, the shoes will open. A uniform rappelling velocity is thus ensured, even at a greater load.

Since the device consists of two braking units, they may, by having magnets mounted on them, be set for two different magnetic forces. At a rappelling velocity of 0.4 m/sec only the first braking unit will open at a low weight. In this manner a person of small weight, for instance small children, may be lowered at a corresponding velocity. At a greater load, the second braking unit will be opened and reduce the velocity of the descending heavy person.

In the embodiment shown, the brake pads 10, 10' and the safety brake pads 10", unlike those of the parent patent, are not structured circularly, but as inserts exceeding the height of the brake shoes. This simplifies the manufacture of the brake shoes.

In the embodiment shown in FIGS. 3–6, two open eye bolts 12 are mounted on the housing 1 through which the rope may be guided on both sides for stopping and arresting the rappelling person at any time with very little effort. Such stopping and arresting may be done by the rappelling person himself or by an aide.

The invention claimed is:

1. A rappelling device, comprising:

a housing;

a pulley mounted for rotation within the housing for guiding a rope;

first and second centrifugal brakes each comprising at least first and second brake shoes movable from an idle position to an operating position in response to rotation of the pulley at a predetermined velocity;

means for transmitting the rotation of the pulley to the first and second centrifugal brakes;

- a first brake pad on each of the first and second brake shoes of each of the first and second centrifugal brakes for engagement with the housing when the first and second brake shoes are in their operating position;
- a second brake pad on the first and second brake shoes of at least one of the first and second centrifugal brakes for engagement with the housing subsequent to the engagement by the first brake pad;
- a magnet on one of the first and second brake shoes of at least one of the first and second centrifugal brakes; and
- an element on the other of the first and second brake shoes responsive to the magnet for maintaining the first and second brake shoes in the idle position.

2. The rappelling device of claim 1, wherein the means for transmitting the rotation of the pulley to the brakes comprises toothed gear means.

3. The rappelling device of claim 1, wherein the first and second brake pads are seated in and protrude out of recesses in the brake shoes.

4. The rappelling device of claim 1, further comprising an eye bolt affixed to each of opposite sides of the housing for guiding the rope running over the pulley.

5. The rappelling device of claim 1, wherein the element responsive to the magnet comprises an iron core.

* * * * *